(12) United States Patent
Zhou et al.

(10) Patent No.: US 12,017,287 B2
(45) Date of Patent: Jun. 25, 2024

(54) CUTTER FOR CUTTING TUBULAR PARTS

(71) Applicant: Ridge Tool Company, Elyria, OH (US)

(72) Inventors: Qi Zhou, Shanghai (CN); Duan Wu, Shanghai (CN); Xinwen Yang, Shanghai (CN); Kuo Wu, Shanghai (CN); Zhiping Fang, Shanghai (CN)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 17/420,414

(22) PCT Filed: Dec. 18, 2019

(86) PCT No.: PCT/US2019/067067
§ 371 (c)(1),
(2) Date: Jul. 2, 2021

(87) PCT Pub. No.: WO2020/149975
PCT Pub. Date: Jul. 23, 2020

(65) Prior Publication Data
US 2022/0088689 A1  Mar. 24, 2022

(30) Foreign Application Priority Data
Jan. 14, 2019 (CN) .......................... 201920055106.X

(51) Int. Cl.
*B23D 21/08* (2006.01)
*B23D 21/00* (2006.01)
(Continued)

(52) U.S. Cl.
CPC .............. *B23D 21/08* (2013.01); *B23D 21/00* (2013.01); *B23D 45/124* (2013.01); *B23D 47/04* (2013.01); *B23D 45/10* (2013.01)

(58) Field of Classification Search
CPC ........ B23D 21/00; B23D 21/04; B23D 21/08; B23D 45/10; B23D 45/125; B23D 47/04;
(Continued)

(56) References Cited

U.S. PATENT DOCUMENTS

| | | | | |
|---|---|---|---|---|
| 1,231,462 A | * | 6/1917 | Tutwiler | G01G 19/14 |
| | | | | 212/346 |
| 1,945,949 A | * | 2/1934 | Myers | B23D 21/08 |
| | | | | 269/174 |

(Continued)

FOREIGN PATENT DOCUMENTS

| | | |
|---|---|---|
| CN | 201470987 | 5/2010 |
| CN | 207171068 U | 4/2018 |

(Continued)

OTHER PUBLICATIONS

KR-101001283-B1 English translation; Dec. 2010; KR; Chang Jong Deok.*

(Continued)

*Primary Examiner* — Laura M Lee
(74) *Attorney, Agent, or Firm* — Mark Bandy; Rankin Hill & Clark, LLP

(57) ABSTRACT

A powered cutting tool for cutting tubular or cylindrical workpieces such as pipe is described. The cutting tool includes a base, an electric motor, a collection of rollers, a frame, a feedscrew, an auto cut wheel system, and a handle for rotating the feedscrew and adjusting the position of the auto cut wheel system relative to the rollers. In certain versions, the cutting tool includes torque-limiting provisions, to limit the amount of torque applied to the feedscrew. In certain versions, the cutting tool includes rollers and press wheels featuring non-metal outer surfaces.

13 Claims, 15 Drawing Sheets

(51) Int. Cl.
*B23D 45/12* (2006.01)
*B23D 47/04* (2006.01)
*B23D 45/10* (2006.01)

(58) Field of Classification Search
CPC .............. B26D 2007/013; B26D 3/169; Y10T 82/1655; Y10T 82/16967
USPC ............................................ 30/97, 101, 102
See application file for complete search history.

(56) References Cited

U.S. PATENT DOCUMENTS

| | | | | |
|---|---|---|---|---|
| 3,100,934 | A * | 8/1963 | Jonasson | B23D 21/08 30/102 |
| 3,240,088 | A * | 3/1966 | Samuels | B23D 21/08 82/128 |
| 3,655,161 | A * | 4/1972 | Schueler | E04G 25/06 248/354.5 |
| 3,756,100 | A * | 9/1973 | Bachmann | B23D 21/00 82/113 |
| 3,849,887 | A * | 11/1974 | Brainin | A61C 8/0012 433/201.1 |
| 3,965,572 | A * | 6/1976 | Strybel | B23D 21/08 81/136 |
| 4,072,073 | A * | 2/1978 | Birkestrand | B23D 21/00 82/101 |
| 4,279,181 | A * | 7/1981 | Birkestrand | B23D 21/00 82/71 |
| 4,412,401 | A * | 11/1983 | Fundell | B23D 45/044 82/86 |
| 4,443,943 | A * | 4/1984 | Maruyama | B23D 21/08 81/177.9 |
| 5,027,681 | A * | 7/1991 | Hyvarinen | B23D 45/124 409/199 |
| 5,261,301 | A * | 11/1993 | Babb | B23D 21/00 82/86 |
| 5,315,759 | A * | 5/1994 | Mashata | B23D 21/00 30/97 |
| 5,515,609 | A * | 5/1996 | Sperti | B23D 21/10 30/95 |
| 5,809,652 | A * | 9/1998 | Ducret | H02G 1/1231 30/90.9 |
| 6,401,340 | B1 * | 6/2002 | King | B23D 21/08 30/101 |
| 6,581,499 | B2 * | 6/2003 | Myers | B23D 31/00 82/123 |
| 6,666,062 | B2 * | 12/2003 | Dole | B23B 5/16 72/123 |
| 10,589,365 | B2 * | 3/2020 | Krause | B23D 33/10 |
| 2004/0165943 | A1 * | 8/2004 | Herb | F16B 37/0864 403/256 |
| 2009/0283653 | A1 * | 11/2009 | Zhang | F16M 11/22 248/352 |
| 2010/0199499 | A1 * | 8/2010 | Dibble | B23D 21/08 30/102 |
| 2014/0150266 | A1 * | 6/2014 | Priha | B23D 21/00 29/592 |
| 2019/0329335 | A1 * | 10/2019 | Xu | B23D 21/08 |

FOREIGN PATENT DOCUMENTS

| | | | |
|---|---|---|---|
| CN | 208215408 U | 12/2018 | |
| DE | 2555498 | 9/1976 | |
| FR | 2774613 | 8/1999 | |
| KR | 20060052723 A | 5/2006 | |
| KR | 101001283 B1 * | 12/2010 | ............... B26D 3/16 |

OTHER PUBLICATIONS

Search Report and Written Opinion dated Mar. 16, 2020; Application No. PCT/US19/67067; 11 pages.
Extended European Search Report dated Apr. 19, 2023; Application No. EP19910523.0; 13 pages.
Partial Search Report dated Feb. 1, 2023; Application No. EP19910523.0; 17 pages.
Chinese Office Action and Search Report dated Jan. 20, 2024; Application No. 201980088847.0; 9 pages.

* cited by examiner

CUTTER FOR CUTTING TUBULAR PARTS

FIELD

The present subject matter relates to cutting tools and particularly to cutting tubular or cylindrical components.

BACKGROUND

Most cutters for thin-wall stainless steel tubes are manually powered, and require expenditure of operator time and application of force. The known powered cutters are complex to operate, and respond slowly when changing size of cut or workpiece. Accordingly, a need remains for a quick-acting stainless steel powered cutter that can cut multiple sizes of stainless steel tubes. Providing such a cutter would enable users to cut tubes quickly and easily, and improve work efficiency.

Most cutters for thin-wall steel tubes use steel rollers, and such rollers can damage the surface of coated tubes during cutting operations. Although non-metal roller(s) can protect the surface of coated tubes, such rollers typically exhibit low levels of friction and lack strength. Accordingly, a need exists for a cutter utilizing metal roller(s) having increased strength, and which provides sufficient friction against the surface of coated tubes. Providing such a cutter would enable users to cut coated tubes without damaging the surface of the tubes, while improving work efficiency.

Most powered cutters for thin-wall stainless steel tubes are difficult to operate, and heavy to move. In addition, these powered cutters have a bulky appearance. Accordingly, a need exists for a powered cutter that is easy to operate, relatively lightweight, and which features an attractive and ergonomic design. Providing such a cutter would enable users to move the cutting machine more easily, and cut tubes more safely, with improved work efficiency.

SUMMARY

The difficulties and drawbacks associated with previous approaches are addressed in the present subject matter as follows.

In one aspect, the present subject matter provides a powered cutting tool comprising a base and an electric motor. The cutting tool also comprises a plurality of rollers rotatably supported on the base, at least one of which is rotatably powered by the motor. The cutting tool also comprises a frame extending from the base, in which the frame defines a threaded receiving region. The cutting tool additionally comprises a feedscrew defining a first end and a second end. The feedscrew includes a threaded region extending at least partially between the first end and the second end. The threaded region of the feedscrew is threadedly engaged with the threaded receiving region of the frame. The cutting tool also comprises a handle engaged at the first end of the feedscrew.

In another aspect, the present subject matter provides a powered cutting tool comprising a base and an electric motor. The cutting tool also comprises a plurality of rollers including a support roller. The plurality of rollers are rotatably supported on the base, at least one of which is rotatably powered by the motor. The cutting tool also comprises a frame extending from the base. The frame defines a threaded receiving region. The cutting tool additionally comprises a feedscrew defining a first end and a second end. The feedscrew includes a threaded region extending at least partially between the first end and the second end. The threaded region of the feedscrew threadedly is engaged with the threaded receiving region of the frame. The cutting tool also comprises a handle engaged at the first end of the feedscrew. The cutting tool also comprises a cutting wheel system engaged at the second end of the feedscrew. The cutting wheel system includes at least one cutting wheel and a press wheel. Upon rotation of the handle and the feedscrew, the distance between the cutting wheel system and the plurality of rollers is selectively adjusted. Each of the support roller and the press wheel include a non-metal outer surface.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Generally, the present subject matter provides a cutting tool comprising a base, an electric motor, a plurality of rollers in which at least one roller is powered by the motor, a frame extending from the base and having a threaded receiving region, a feedscrew threadedly engaged with the frame in the receiving region, a handle at a first end of the feedscrew, and an auto cut wheel system at the second end of the feedscrew. Upon rotation of the handle and the feedscrew, the distance between the auto cut wheel system and the plurality of rollers is selectively adjusted.

Figure 1:
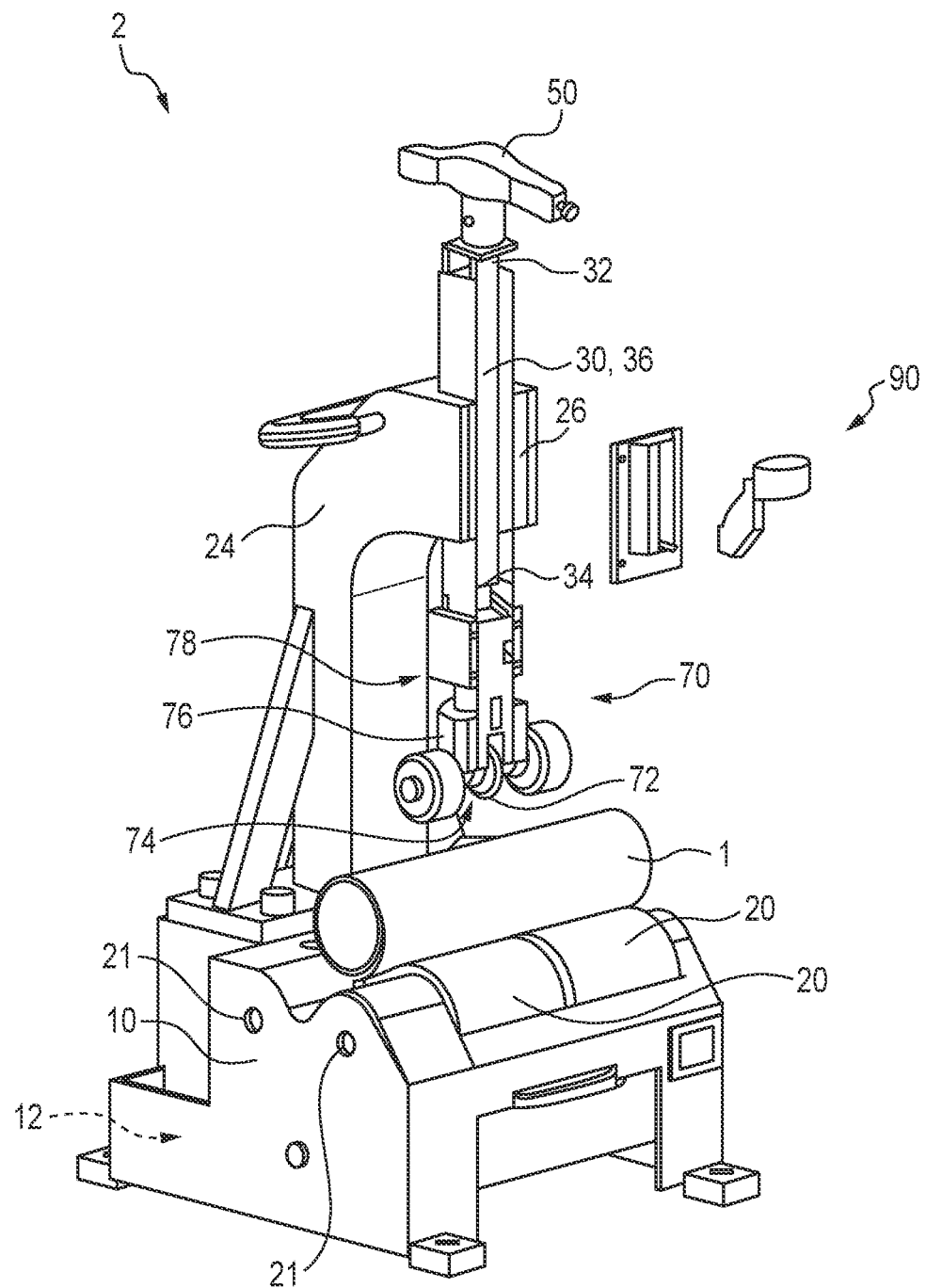
FIG. 1 illustrates a partially exploded assembly view of an embodiment of a powered cutting tool in accordance with the present subject matter.
Figure 2:
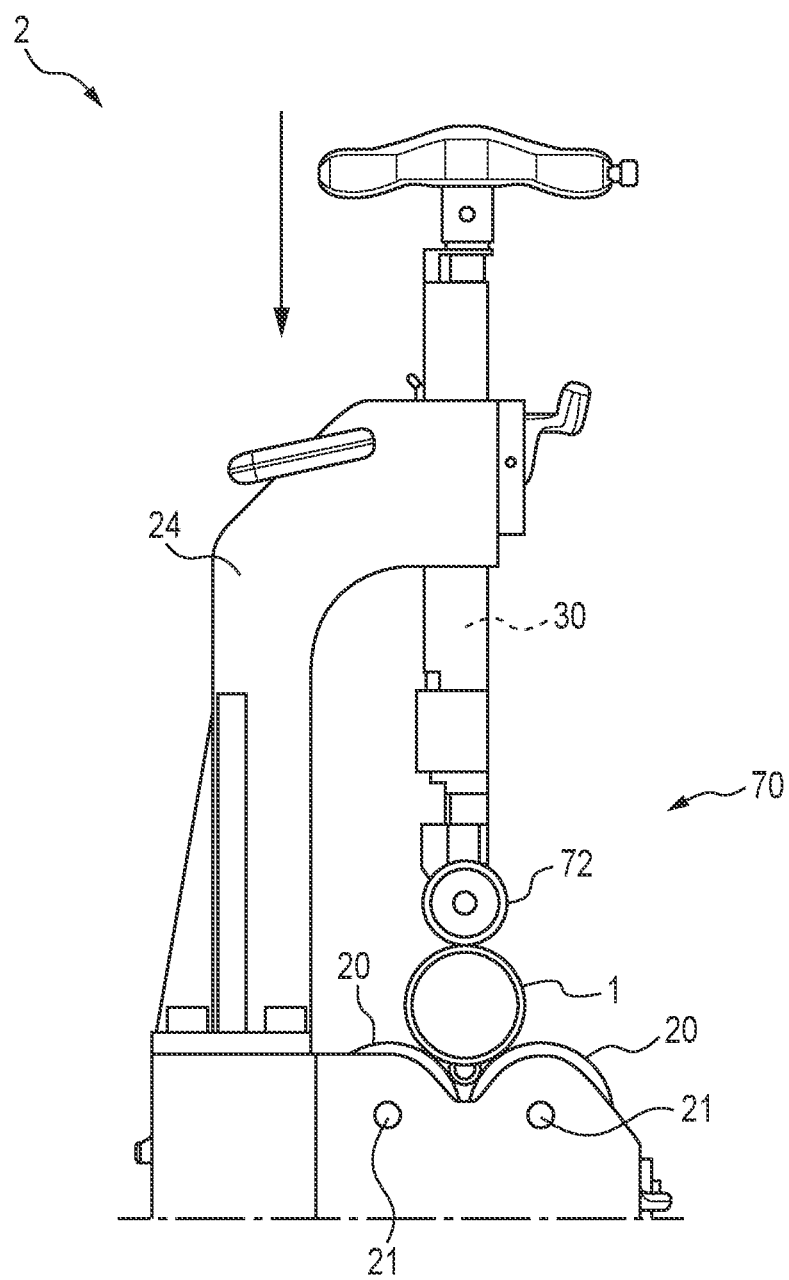
FIG. 2 illustrates positioning of a cutting wheel of the tool to contact a tube to be cut.
Figure 3:
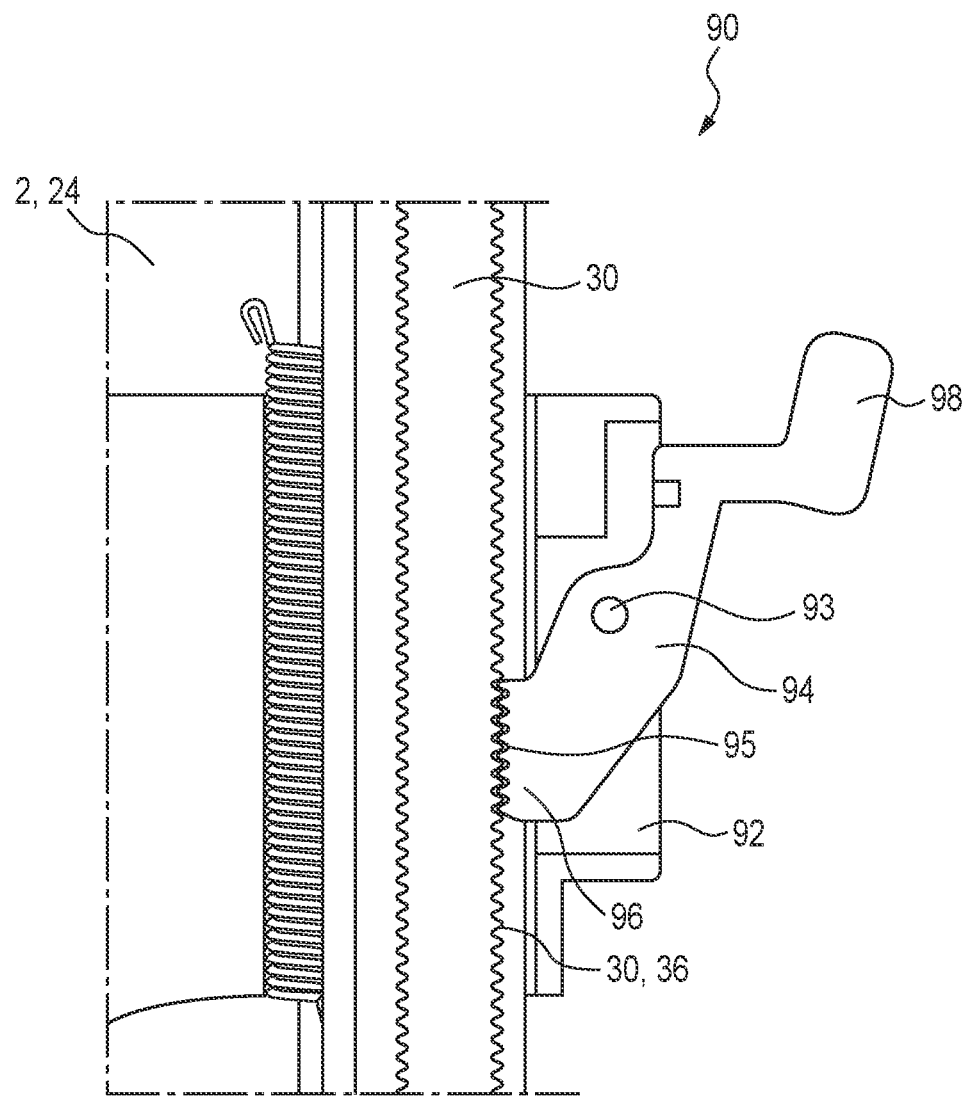
FIG. 3 is a detailed view illustrating an embodiment of a latch assembly used in certain versions of the cutting tools of the present subject matter.
Figure 4:
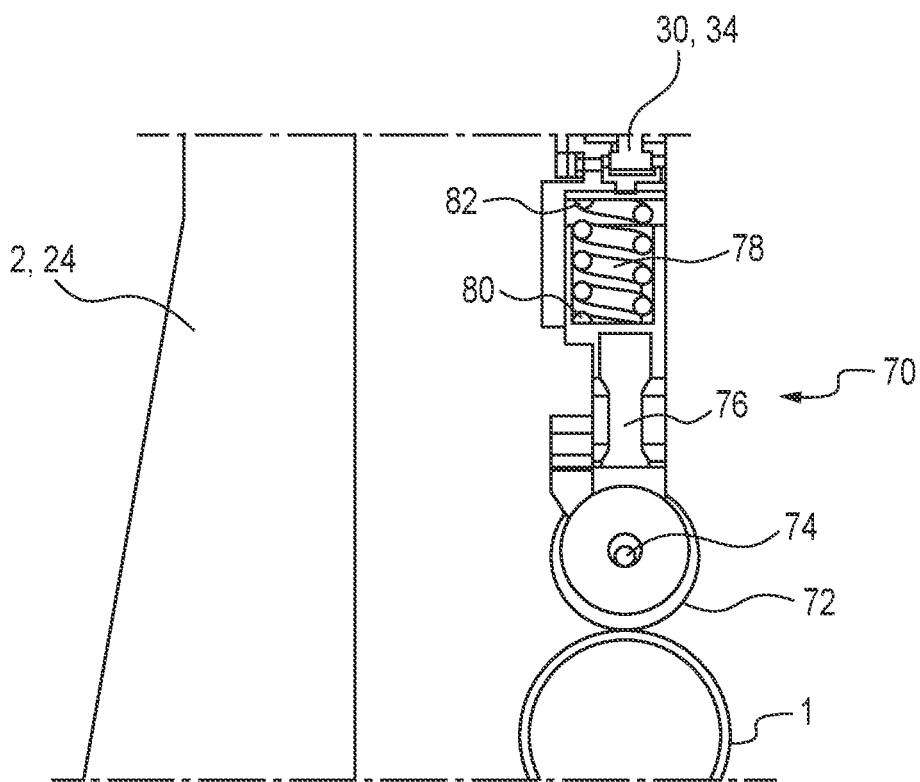
FIG. 4 illustrates a feed spring of the tool in which the feed spring is in a free state.
Figure 5:
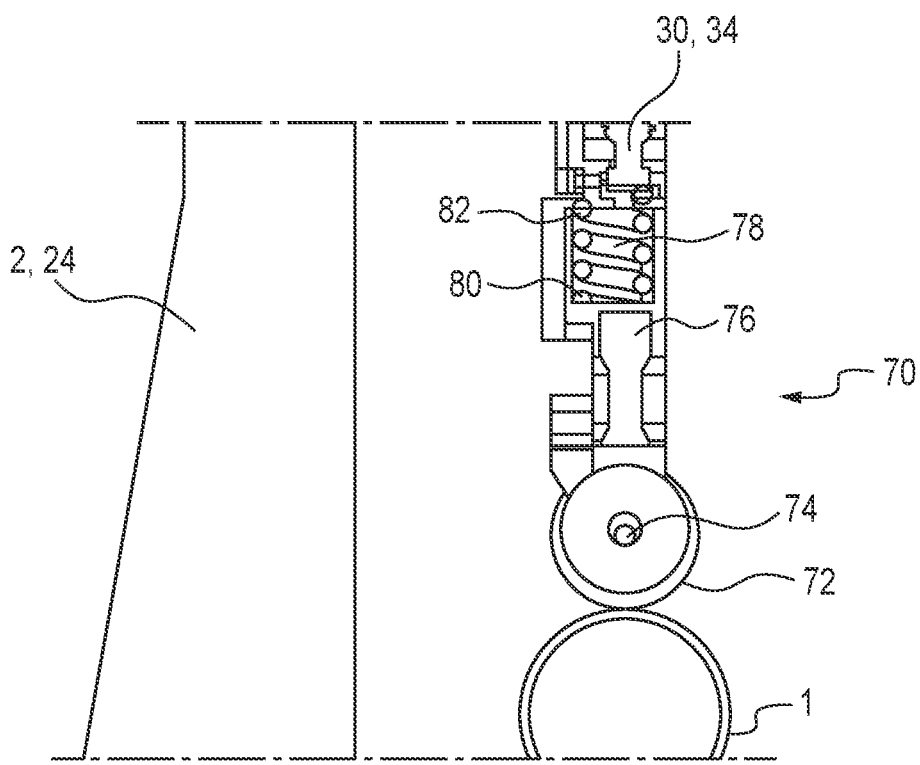
FIG. 5 illustrates the feed spring in a compressed state.
Figure 6:
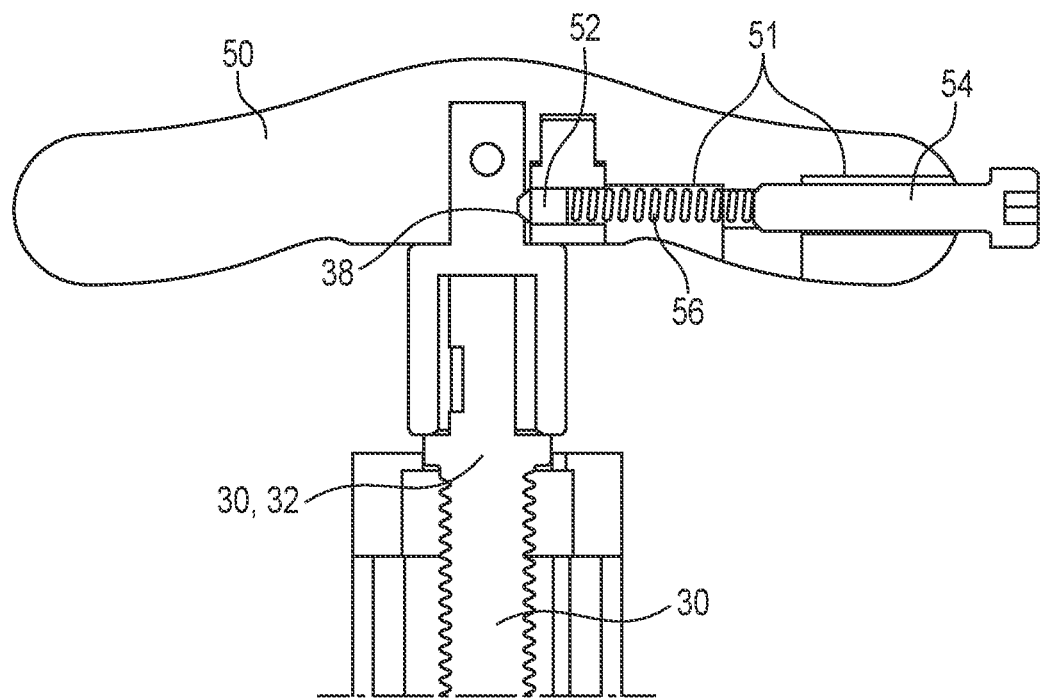
FIG. 6 illustrates an embodiment of a torque limiting handle assembly used in certain cutting tools in accordance with the present subject matter.

FIG. 1 illustrates an embodiment of a tube cutter in accordance with the present subject matter. A tube to be cut or severed is positioned on the rollers of the cutter, and then the feedscrew is positioned downward by rotation of a handle, until a cutting blade or cutting wheel contacts the surface of the tube, as shown in FIG. 2. A latch assembly then locks the position of the feedscrew as shown in FIG. 3. A feed spring is then positioned from a free state as shown in FIG. 4 to a compressed state as shown in FIG. 5. Additional aspects and details are described herein.

In many versions, the handle includes a torque limiting assembly. Turning the torque-limit handle in a first rotational direction such as for example clockwise, the threaded feedscrew then moves towards a tube to be cut until contact occurs between the cutting blade and the tube. Upon continued rotation of the handle and feedscrew, the cutting blade will not move down due to contact with the tube, but a feed spring will be compressed and store potential energy as described in greater detail herein and shown in FIG. 5. Upon compression of the feed spring, the cutting blade will apply a pre-cut force on the outer surface of the tube. These features are described in greater detail as follows.

Specifically, FIG. 1 illustrates a cutting tool 2 comprising a base 10, an electric motor 12 and optional transmission or gearbox disposed within the base 10, and a plurality of rollers 20 rotatably supported on the base 10. One or more roller(s) 20 are rotatably supported via axles 21. The axles 21 are oriented parallel to each other. Each axle 21 can serve one or more rollers 20. The cutting tool 2 is shown in a partially exploded view to further reveal various components. One or more of the rollers 20 are rotatably powered by the motor 12. The plurality of rollers may include one or more non-metal support roller(s) as described in greater detail herein. The cutting tool 2 also comprises a frame 24 extending from the base 10. The frame defines a threaded receiving region 26. The cutting tool 2 also comprises a feedscrew 30 defining a first end 32, a second end 34 generally opposite the first end, and a threaded region 36 extending at least partially between the first end 32 and the second end 34. The threaded region 36 of the feedscrew 30 is threadedly engaged with the threaded receiving region 26 of the frame 24. The cutting tool 2 also comprises a handle 50 engaged at the first end 32 of the feedscrew 30. In certain embodiments, the cutting tool 2 additionally comprises a cutting wheel system and more particularly an auto cut wheel system 70 engaged at the second end 34 of the feedscrew 30. Upon rotation of the handle 50 and the feedscrew 30, the distance between the auto cut wheel system 70 and the plurality of rollers 20 is selectively adjusted. Thus, the present subject matter provides cutting tools that include the noted auto cut wheel system; and other versions of cutting tools that are free of the auto cut wheel system. In FIG. 1, a latch assembly 90 is removed from the frame 24 of the cutting tool 2. The latch assembly 90 is described in greater detail herein.

FIG. 2 illustrates in greater detail the cutting tool 2 in which the feedscrew 30 has been positioned such that the cutting wheel 72 contacts an outer surface of a tube 1 to be cut. In FIG. 2, optional press wheels described in greater detail herein, are shown removed to further illustrate the cutting wheel 72.

Figure 11:
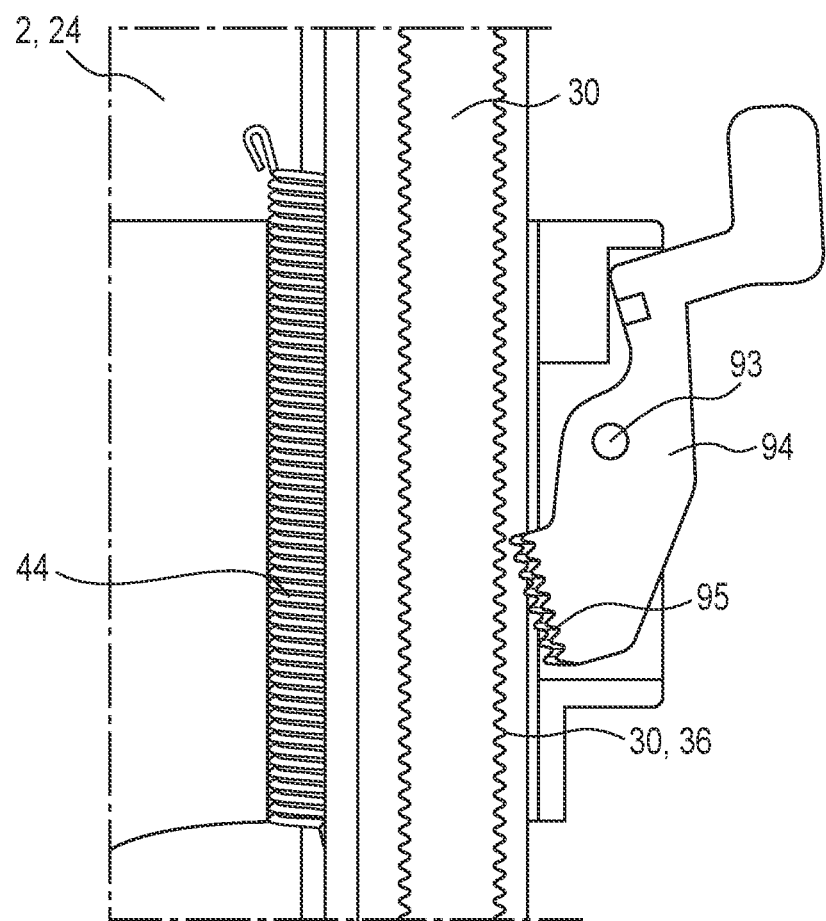
FIG. 11 illustrates the latch assembly in a disengaged state.

FIG. 3 shows an embodiment of a latch assembly 90 used in certain versions of the cutting tools 2. The latch assembly 90 includes a latch base 92 mounted or otherwise secured to the frame 24 of the tool 2. The latch assembly 90 also includes a selectively positionable member 94 movably mounted, for example pivotally secured, to the latch base 92 via a pivot 93 or other member. The member 94 defines an engagement end 96 adapted for contacting and engaging the feedscrew 30, and a gripping end 98 adapted for grasping by a user. As will be understood by further reference to FIG. 3, upon moving the engagement end 96 of the member 94, into contact and ultimately into engagement with the feedscrew 30, axial displacement of the feedscrew is then precluded or significantly limited. FIG. 3 illustrates the engagement end 96 including a threaded region 95 which includes threads or portions of threads configured to match and thus threadedly engage the threads of the threaded region 36 of the feedscrew 30. However, the present subject matter includes alternative engagement provisions. For example, if sufficiently high levels of friction can be achieved between the engagement end 96 and the feedscrew 30, non-threaded frictional engagement provisions could be used. The member 94 is positionable between an engaged position in which the engagement end 96 of the member 94 is in contact with and engaged with the feedscrew 30, and a disengaged position in which the engagement end 96 of the member 94 is free from contact with the feedscrew 30. FIG. 3 illustrates the member 94 of the latch assembly 90 in an engaged position. FIG. 11 illustrates the member 94 of the latch assembly 90 in a disengaged position.

Referring to FIGS. 1, 4, and 5, in certain versions, the auto cut wheel system 70 includes a cutting wheel 72, an axle assembly 74, a feed spring 78, and a carriage 76 disposed between the axle assembly 74 and the feed spring 78. More particularly, the feed spring 78 defines a first end 80 and a second end 82. And the carriage 76 is disposed between the axle assembly 74 and the first end 80 of the feed spring 78. The second end 82 of the feed spring 78 is engaged with or adjacent to the second end 34 of the feedscrew 30.

FIGS. 4 and 5 also illustrate various states of the feed spring 78 of the auto cut wheel system 70. Upon initial contact between the cutting wheel 72 and an outer surface of a tube 1 to be cut, the feed spring 78 is in a free state in which the spring has not undergone any compression, as shown in FIG. 4. Upon further linear displacement of the feedscrew 30 toward the tube 1 caused by rotation of the handle 50 (see FIG. 1), the feed spring 78 is compressed as shown in FIG. 5. As will be understood, compression of the feed spring 78 applies a compressive force on the outer surface of the tube 1 to be cut.

Thus in operation, a tube 1 to be cut is positioned on the plurality of rollers 20. The feedscrew 30 is rotated about its longitudinal axis by an operator using the handle 50, thereby linearly moving the auto cut wheel system 70 and the cutting wheel 72 toward the tube. During this phase of movement and up until contact between the cutting wheel 72 and the tube, the feed spring 78 remains in a free state. After contact, the user continues to rotate the feedscrew 30 by the handle 50 thereby compressing the feed spring 78 such as shown in FIG. 5. The operator continues to rotate the handle 50 and cause compression of the feed spring 78, and application of a pre-cut force by the cutting wheel 72 on the outer surface of the tube. As described herein, in many versions of the cutting tools, a torque limiting handle assembly is utilized which limits the extent of compression of the feed spring 78 by an operator. As will be understood, this limits the application of force by the cutting wheel 72 on the outer surface of the tube. After sufficient turning of the handle 50 and application of a desired pre-cut force on the tube to be cut, the latch assembly 90 is engaged to thereby lock the feedscrew 30 in a desired position.

Figure 7:
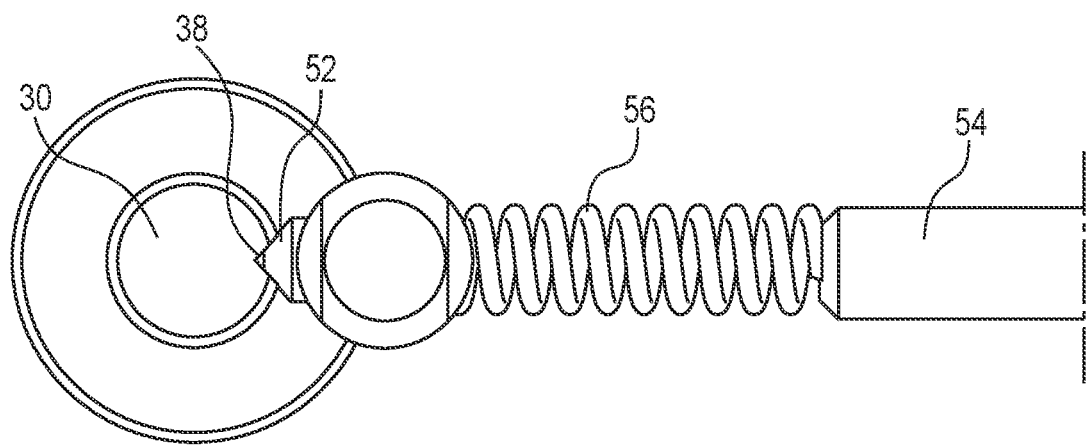
FIG. 7 illustrates components of the torque limiting handle assembly in which applied torque from a handle is transferred to a feedscrew.
Figure 8:
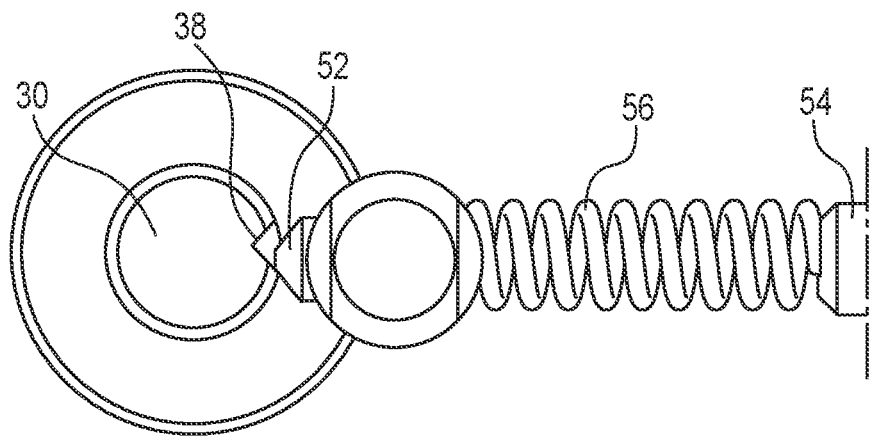
FIG. 8 illustrates components of the torque limiting assembly in which applied torque from a handle exceeds a preset torque limit.
Figure 9:
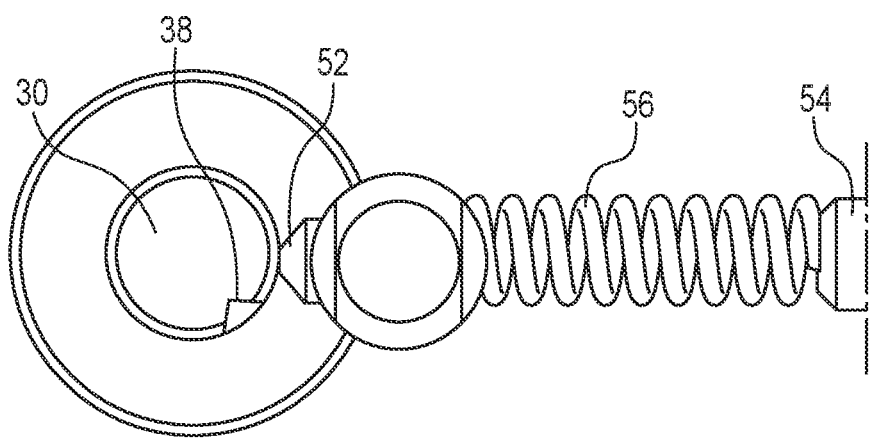
FIG. 9 illustrates components of the torque limiting assembly in which applied torque from a handle is not transferred to a feedscrew.

FIGS. 6 to 9 show additional details of an embodiment of the torque limiting handle assembly. Positioned within an aperture 51 or hollow interior region of the handle 50, a cone pin 52, adjust spring 56 and adjust screw 54, are located. The cone pin 52 fits with a notch 38 on the feedscrew 30, as shown in FIG. 7. That is, the cone pin 52 and/or the notch 38 are sized and/or shaped to fittingly engage each other. The compressive force of the adjust spring 56 can be adjusted by the adjust screw 54. When the cutting blade contacts the tube, the torque to rotate the handle will increase and the cone pin 52 in the handle receives an increased force to depart the notch 38 until the cone pin 52 is pushed apart from the notch 38 on the feedscrew 30, as shown in FIG. 8. Then the handle will rotate independently of the feedscrew 30 and thus the feedscrew remains in position as shown in FIG. 9. Damage can be avoided due to overload on either the cutting blade or the tube.

More specifically and with further reference to FIGS. 6-9, the feedscrew 30 defines a notch 38 proximate the first end 32 of the feedscrew 30. The torque limiting provisions include a cone pin 52 sized and shaped to releasably engage the notch 38 defined in the feedscrew 30. The torque limiting provisions also include an adjusting screw 54 and an adjusting spring 56 disposed between the cone pin 52 and the adjusting spring 56. Upon rotating the adjusting screw 54, the adjusting spring 56 applies a compressive force on the cone pin 52.

Figure 10:
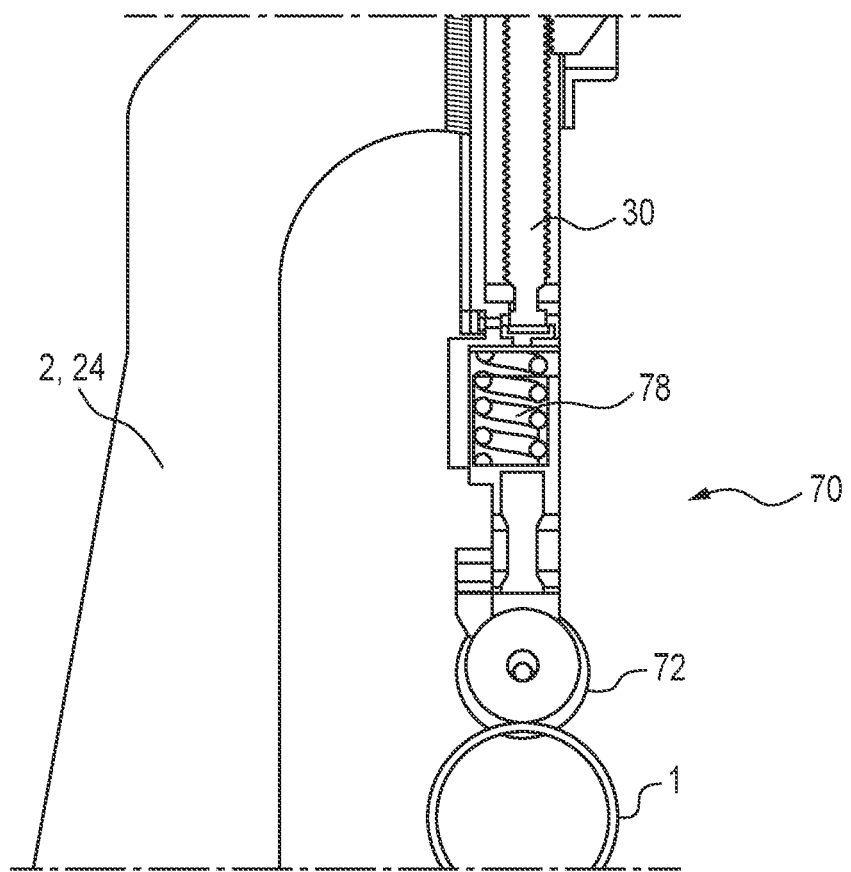
FIG. 10 illustrates portions of the cutting tool and a cutting wheel after completion of a cutting operation on a tube.

After application of the desired pre-cut force on the tube, the power of the cutting machine is turned on, and the motor drives and rotates the roller(s) to rotate a tube or workpiece positioned thereon. The cutting blade is continuously urged into the surface of the tube due to the pre-force, and is continuously urged into the tube during the rotation of the workpiece until the tube is cut and the blade penetrates the tube, as shown in FIG. 10. After cutting, the feed spring returns to its initial or free state.

Loosening or rotating the handle 50 in the opposite direction, removes the force on the tube. The latch is then pressed or otherwise disengaged to loosen the restriction on the feedscrew as shown in FIG. 11. Under the action of an optional return spring 44, the feedscrew 30 and the auto cut wheel system 70 can be returned to an initial position.

Figure 12:
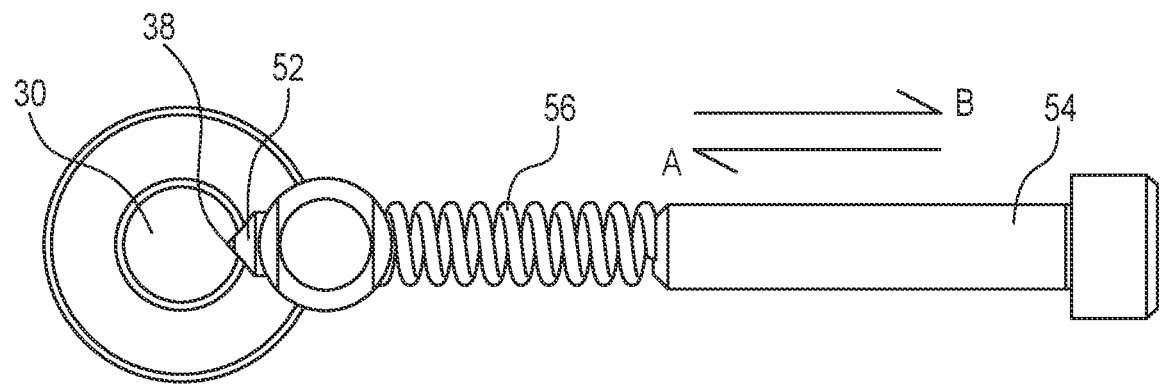
FIG. 12 is another view illustrating components of a torque limiting handle assembly.
Figure 13:
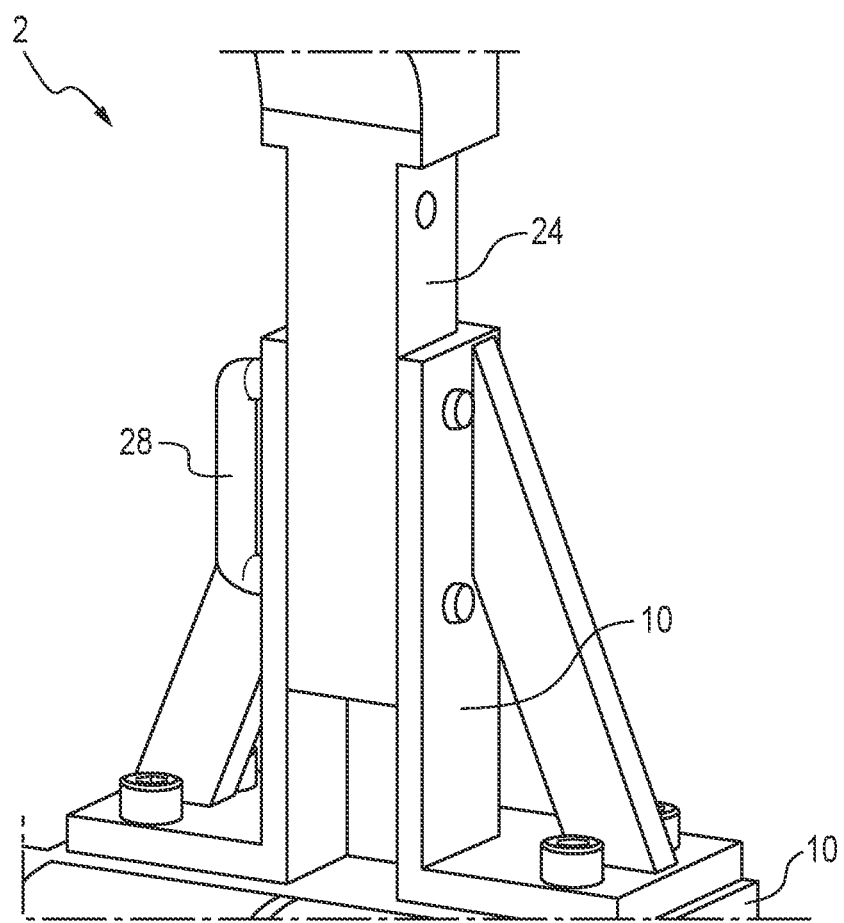
FIG. 13 illustrates an adjustment assembly for selectively raising or lower the height of the cutting tool.

In some applications, and for cutters utilizing the torque limiting handle assembly, in order to increase the pre-force of the cutter, the elastic compressive force generated by the adjust spring 56 can be increased by tightening the adjust screw 54 typically accessible at the aperture 51 of the handle 50, thereby increasing the friction between the cone pin 52 and the notch 38 of the feedscrew 30. This serves to increase the torque that can be applied by the rotating handle, and vice versa, as shown in FIG. 12. Specifically, upon rotating the adjust screw 54 in a first rotational direction to cause linear movement of the screw 54 toward the adjust spring 56 in the direction of arrow A shown in FIG. 12, the compressive force applied to the cone pin 52 is increased. And, upon rotating the adjust screw 54 in a second rotational direction opposite from the first rotational direction to cause linear movement of the screw 54 away from the adjust spring 56 in the direction of arrow B, the compressive force applied to the cone pin 52 is reduced.

Figure 14:
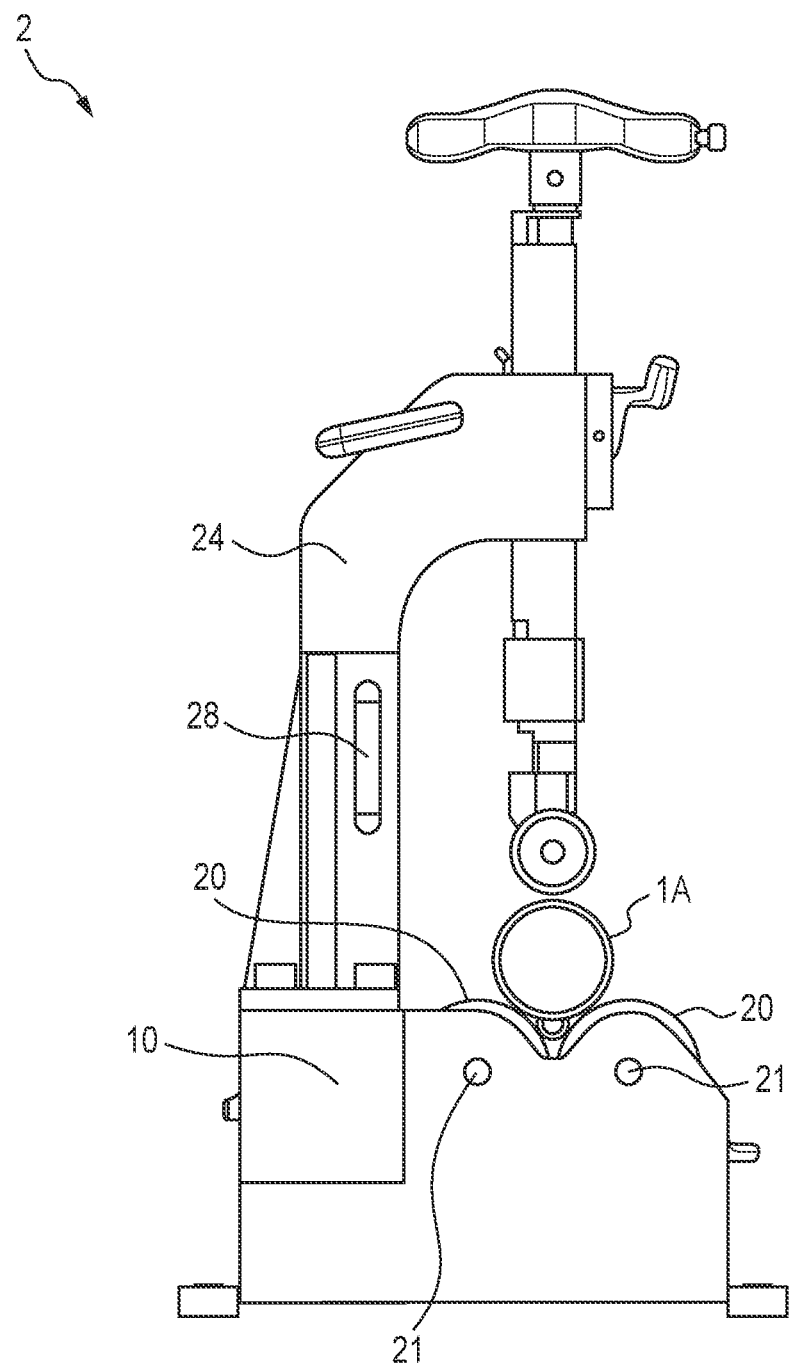
FIG. 14 illustrates height adjustment provisions in which the cutting tool is in a lowered position.
Figure 15:
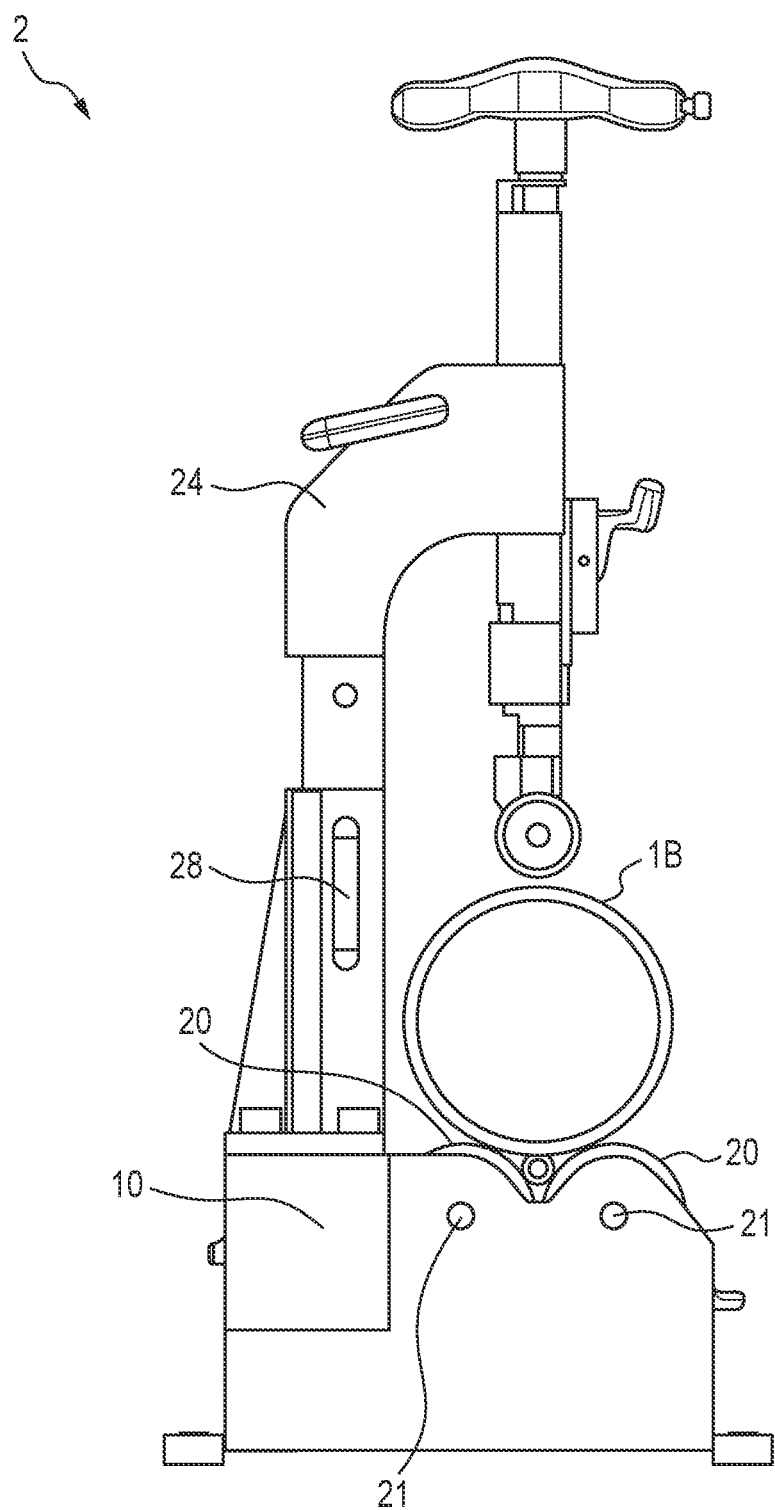
FIG. 15 illustrates the cutting tool in a raised position.

In certain embodiments, the cutting tool 2 includes height adjusting provisions. Typically, such provisions enable selective positioning of the frame 24 relative to the base 10. For cutting small tubes less than 2 inches for example, one can use a lowered position of the movable frame. For cutting large tubes larger than 2 inches for example, a user can adjust the frame to a raised position. Typically, a user can retract and/or remove a member from receiving apertures in the frame 24 and the base 10, such as a double pin 28, and move the frame to a raised position, and then fix the position of the frame with the pin again. Thus the cutter device can be adjusted to be more compact. FIG. 14 illustrates the cutting tool 2 in a lowered position to better accommodate small size tubes or workpieces such as tube 1A. FIG. 15 illustrates the cutting tool 2 in a raised position to better accommodate larger size tubes or workpieces such as tube 1B.

Figure 16:
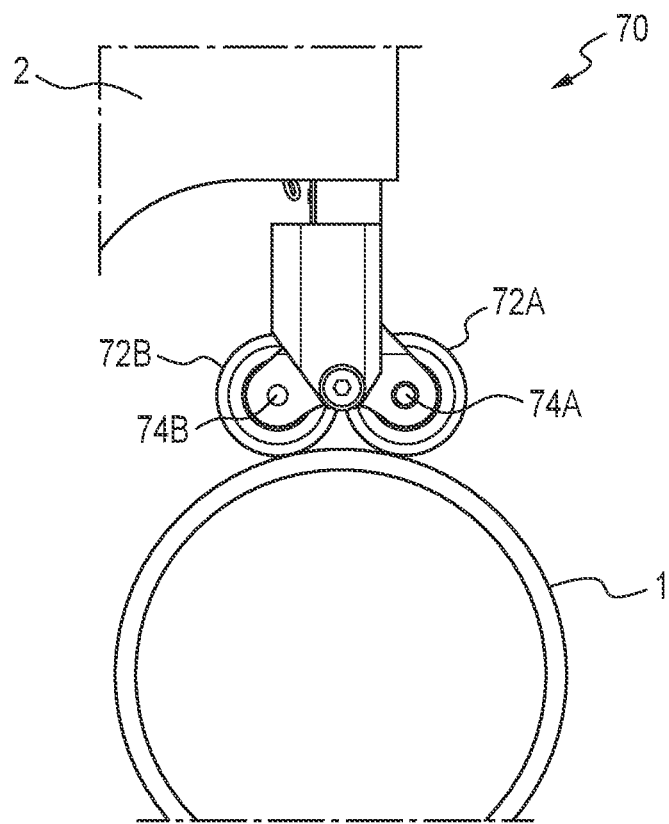
FIG. 16 illustrates an embodiment of the cutting tool using double cutting blades.

The cutting tool 2 can also be used with a plurality of blades and particularly double blades 72A, 72B as shown in FIG. 16 instead of one blade. In this version, the cutting blade 72A is rotatably supported by an axle 74A; and the cutting blade 72B is rotatably supported by an axle 74B. The axles 74A and 74B are typically oriented parallel to each other. In this version, the tube 1 to be cut will be more stable during cutting. Utilizing multiple blades during cutting will reduce the potential for a "spiral issue" known in the art which can occur when cutting using a single cutting blade. In this version, the auto cut wheel system 70 includes two or more cutting wheels.

Figure 17:
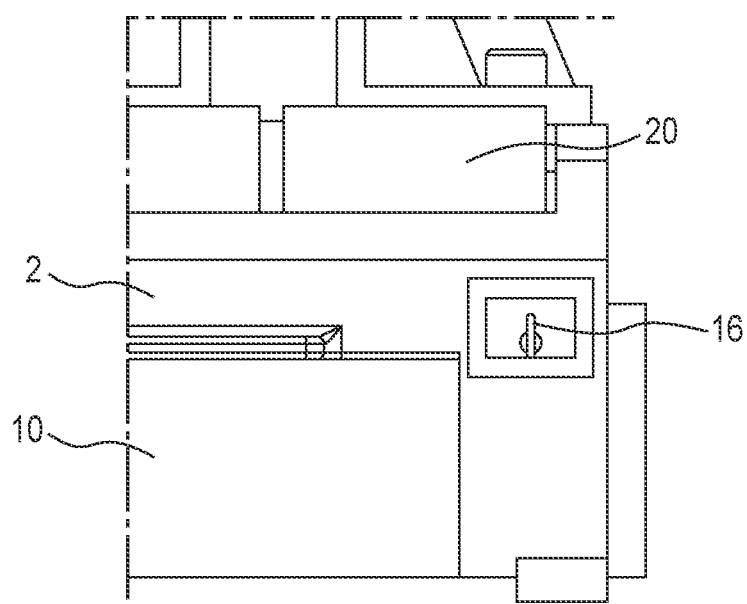
FIG. 17 illustrates an embodiment of the cutting tool with an adjustable speed switch.

An adjustable speed switch can be used, and a small size tube will be more stable when cut at low speed. FIG. 17 illustrates a switch assembly 16 for selecting different motor speeds.

Wire gloves can be used to hold the rotating tubes during cutting and this operation can help to keep the tubes stable.

Figure 18:
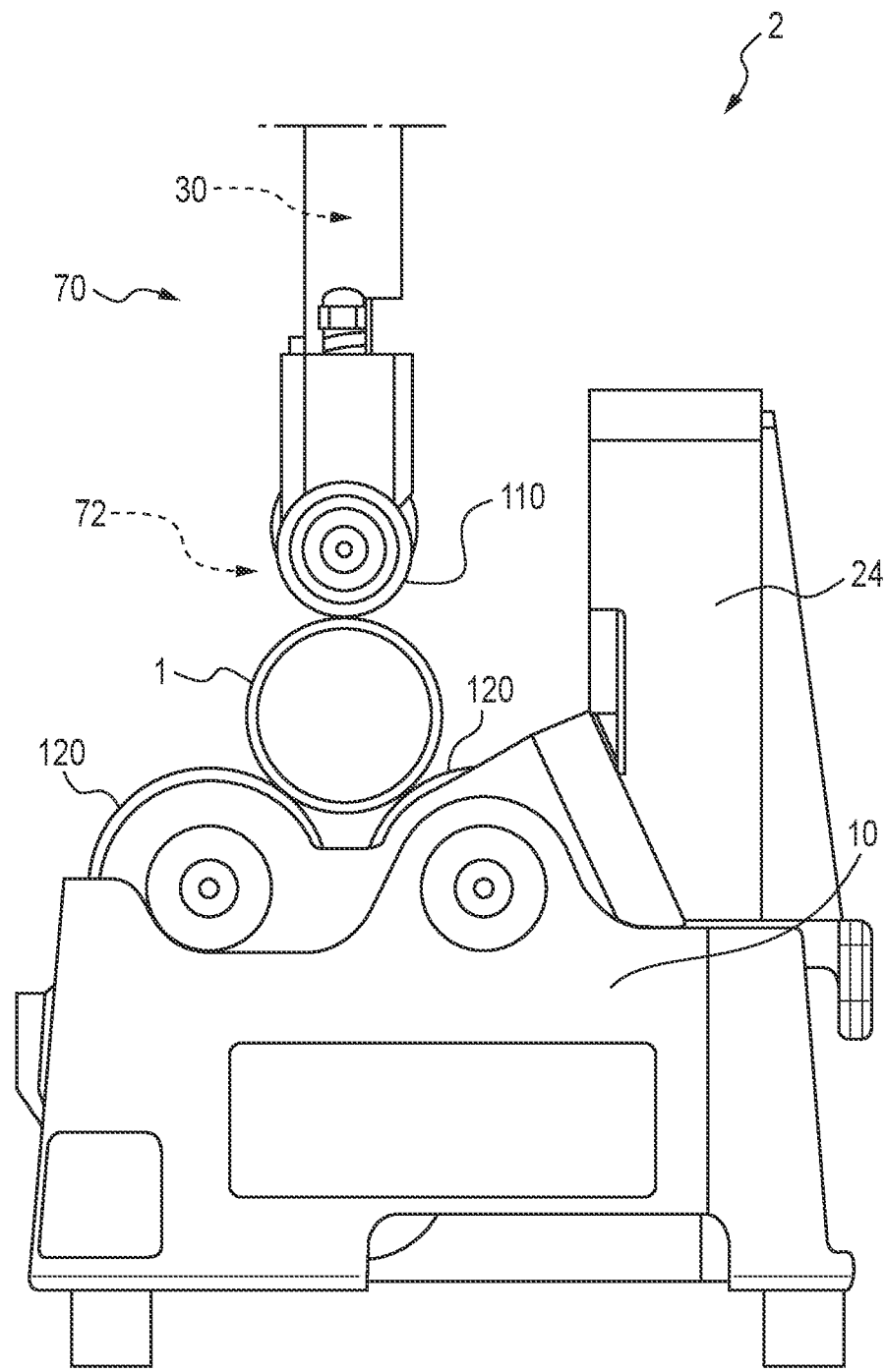
FIG. 18 illustrates additional aspects of the cutting tool including the use of press wheels.

FIG. 18 shows additional aspects of the powered cutting tool 2 and its components. In this embodiment, the cutting tool 2 includes one or more press wheel(s) 110 which are positioned proximate the one or more cutting blades or wheels 72. The press wheel(s) 110 rotate in a plane parallel with that of the cutting wheel(s) 72. In certain versions using a single cutting wheel 72, the press wheel(s) 110 rotate about an axis colinear with an axis of rotation of the cutting wheel 72. Typically, the one or more press wheel(s) 110 are rotatably supported or mounted in the auto cut wheel system 70. In many versions, the press wheel(s) 110 include a non-metal outer surface or periphery. In addition or alternatively, the cutting tool 2 may also utilize one or more non-metal roller(s) 120 which are typically rotatably affixed by the base 10 of the cutting tool 2. In many versions, the non-metal roller(s) 120 includes a non-metal outer surface or periphery. The roller(s) 120 are positioned to rotate about an axis that is parallel with, an axis of rotation of the press wheel(s) 110.

More specifically, FIG. 18 shows additional aspects of the rollers including non-metal rollers 120, the press wheel(s) 110 and a tube 1 to be cut during a cutting operation. The tube 1 is positioned on the plurality of rollers 120 of the cutter 2, and the handle and feedscrew 30 are positioned downward, until the press wheel(s) 110 of the auto cut wheel system 70 contact the surface of the tube 1. After that, the cutting blade 72 will cut into the tube 1 until the tube 1 is completely severed. During the entire operation, the press wheel(s) 110 and the roller(s) 120 form a triangular or three point support arrangement to ensure that the tube 1 is always in a fixed state between the components or sets of components.

Figure 19:
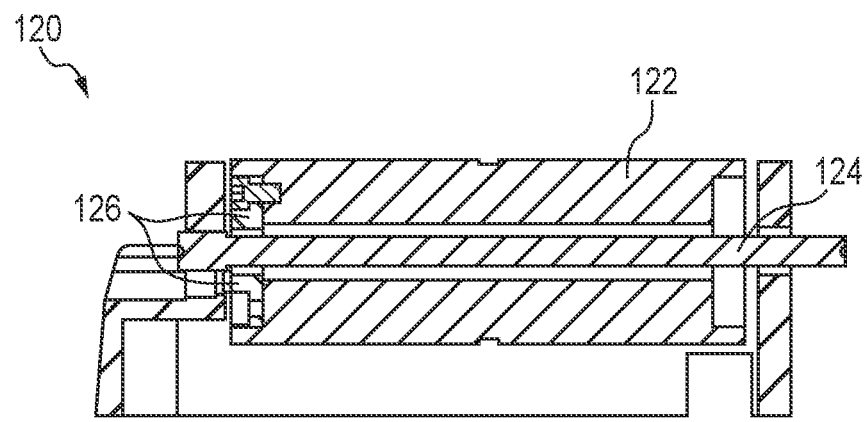
FIG. 19 is a schematic cross sectional view of a non-metal roller used in certain versions of the cutting tool.

FIG. 19 is a cross sectional view of an embodiment of a non-metal roller 120. The roller 120 includes a non-metal body or non-metal outer periphery 122 and a roller shaft 124. The roller shaft 124 is engaged to a motor reduction box or transmission (not shown). In many embodiments, the roller shaft 124 is a rigid shaft, and typically the entirety of the roller body 122 is made of a non-metal material, so the roller body 122 is preferably connected to the roller shaft 124 through a roller connector 126. In the particular version depicted, the roller connector 126 passes through a collection of screw apertures to connect the roller body 122 and the connector 126, and at the same time the roller connector 126 can increase the rotational strength of the roller 120.

Figure 20:
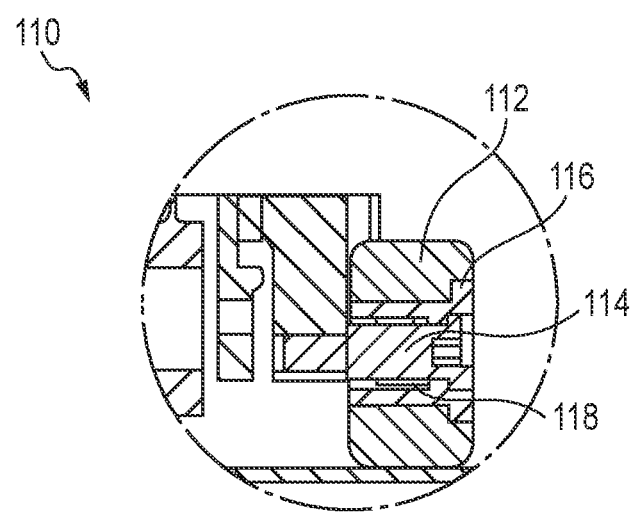
FIG. 20 is a schematic cross sectional view of a press wheel.

FIG. 20 is a cross sectional view of an embodiment of a press wheel 110. FIG. 20 illustrates the internal structure of a non-metal press wheel 110. The press wheel includes a non-metal body or non-metal outer periphery 112, an inner press wheel pin 114, and an intermediate press wheel seat 116 or inner liner. The press wheel pin 114 is connected to the press wheel seat 116. Typically, the press wheel body 112 is made of the same material as the previously noted roller body 122. Typically, the non-metal body 112 or non-metal outer periphery of the press wheel 110 is engaged with the inner liner 116. The inner liner 116 is typically metal such as steel. A needle bearing 118 is installed between the press wheel pin 114 and the steel liner 116 to withstand the pressure and reduce friction to ensure that the press wheel 110 functions as desired.

Non-metal materials for rollers and press wheels include, but are not limited to, polymeric materials such as nylon, nylon plus fiberglass, engineered plastics, acrylonitrile butadiene styrene (ABS plastic), etc. A wide array of composite materials can also be utilized.

Figure 21:
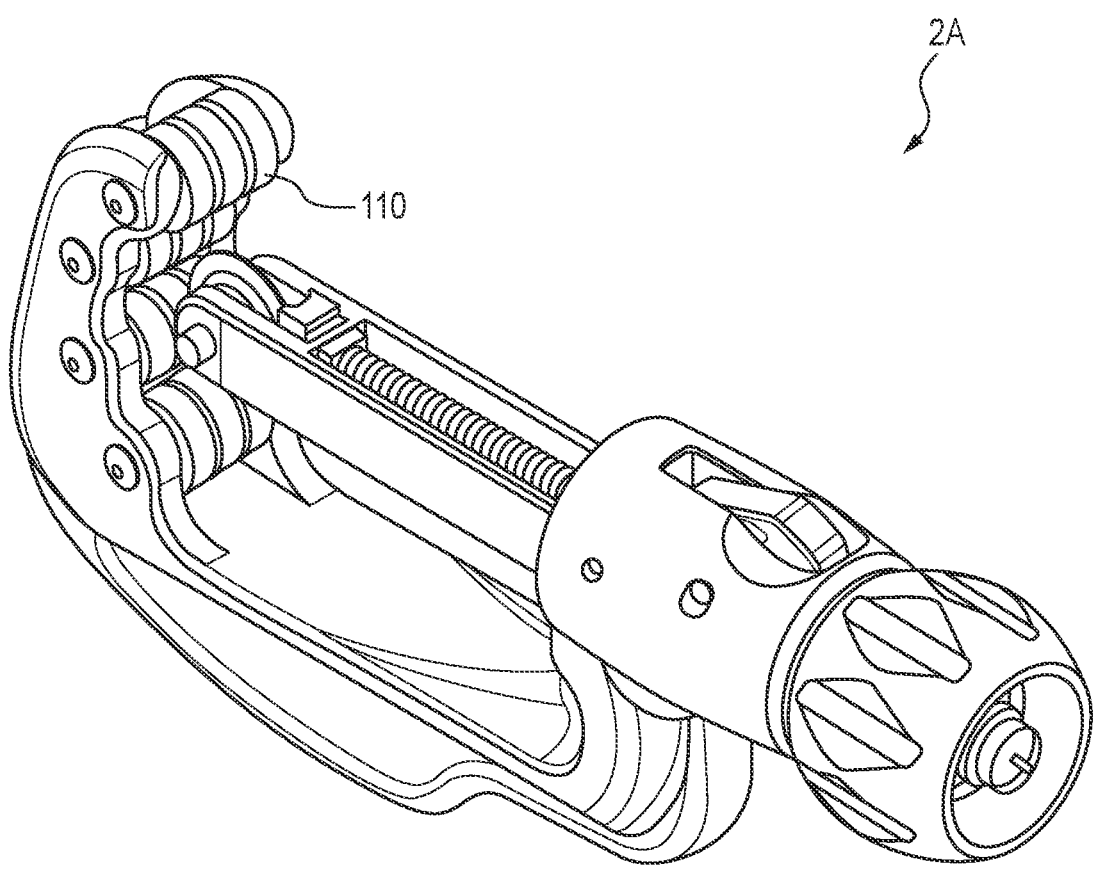
FIG. 21 is a perspective view of another embodiment of the cutting tool in accordance with the present subject matter.

The present subject matter also provides manual tube cutters 2A as shown in FIG. 21 for example. In these embodiments, the cutting tool 2A utilizes one or more press wheel(s) 110 which preferably include non-metal materials as shown in FIG. 21.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A powered cutting tool comprising:
   a base;
   an electric motor;
   a plurality of rollers rotatably supported on the base, at least one of which is rotatably powered by the motor;
   a frame extending from the base, the frame defining a threaded receiving region;
   height adjustment provisions enabling the height of the frame relative to the base, to be selectively adjusted;
   a feedscrew defining a first end and a second end, the feedscrew including a threaded region extending at least partially between the first end and the second end, the threaded region of the feedscrew threadedly engaged with the threaded receiving region of the frame;
   a handle engaged at the first end of the feedscrew;
   a cutting wheel engaged at the second end of the feedscrew;
   at least one press wheel attached to the second end of the feedscrew;
   a latch assembly, the latch assembly including a latch base secured to the frame, and a selectively positionable member movably mounted with the latch base, the member defining an engagement end;
   wherein the member is positionable between an engaged position in which the engagement end of the member is in contact with and engaged with the feedscrew, and a disengaged position in which the engagement end of the member is free from contact with the feedscrew;
   wherein upon rotation of the handle and the feedscrew, the distance between the cutting wheel and the plurality of rollers is selectively adjusted.

2. The powered cutting tool of claim 1 wherein the cutting wheel is a part of an auto cut wheel system which includes:
   an axle assembly;
   a feed spring defining a first end and a second end;
   a carriage disposed between the axle assembly and the first end of the feed spring;
   wherein the second end of the feed spring is engaged with the second end of the feedscrew.

3. The powered cutting tool of claim 1 wherein the feedscrew further defining a notch proximate the first end of the feedscrew and the handle includes:
   a cone pin sized and shaped to releasably engage the notch defined in the feedscrew;
   an adjusting screw;
   an adjusting spring disposed between the cone pin and the adjusting screw;
   wherein upon rotating the adjusting screw, the adjusting spring applies a variable force on the cone pin.

4. The powered cutting tool of claim 2 wherein the auto cut wheel system includes a plurality of cutting wheels.

5. The powered cutting tool of claim 1 further comprising:
   an adjustable speed switch for selecting different motor speeds.

6. The powered cutting tool of claim 1 wherein the plurality of rollers include at least one roller having a non-metal outer surface.

7. The powered cutting tool of claim 1 wherein the at least one press wheel has a non-metal outer surface.

8. A powered cutting tool comprising:
   a base;
   an electric motor operable at different motor speeds;
   an adjustable speed switch for selecting different motor speeds;

a plurality of rollers including a support roller, the plurality of rollers rotatably supported on the base, at least one of which is rotatably powered by the motor;

a frame extending from the base, the frame defining a threaded receiving region;

a feedscrew defining a first end and a second end, the feedscrew including a threaded region extending at least partially between the first end and the second end, the threaded region of the feedscrew threadedly engaged with the threaded receiving region of the frame;

a handle engaged at the first end of the feedscrew;

a cutting wheel system engaged at the second end of the feedscrew, the cutting wheel system including a cutting wheel and a press wheel, the press wheel attached to the second end of the feedscrew;

wherein upon rotation of the handle and the feedscrew, the distance between the cutting wheel system and the plurality of rollers is selectively adjusted;

height adjustment provisions enabling the height of the frame relative to the base, to be selectively adjusted.

9. The powered cutting tool of claim 8 wherein the cutting wheel system further includes:

an axle assembly;

a feed spring defining a first end and a second end;

a carriage disposed between the axle assembly and the first end of the feed spring;

wherein the second end of the feed spring is engaged with the second end of the feedscrew.

10. The powered cutting tool of claim 8 further comprising:

a latch assembly, the latch assembly including a latch base secured to the frame, and a selectively positionable member movably mounted with the latch base, the member defining an engagement end;

wherein the member is positionable between an engaged position in which the engagement end of the member is in contact with and engaged with the feedscrew, and a disengaged position in which the engagement end of the member is free from contact with the feedscrew.

11. The powered cutting tool of claim 8 wherein height adjustment provisions include a removable member insertable into receiving apertures in the frame and the base.

12. The powered cutting tool of claim 11, wherein the frame is movable between a lowered position proximate the plurality of rollers and a raised position distal the plurality of rollers.

13. The powered cutting tool of claim 11 wherein the removable member is a double pin.

* * * * *